United States Patent Office 3,537,334
Patented Nov. 3, 1970

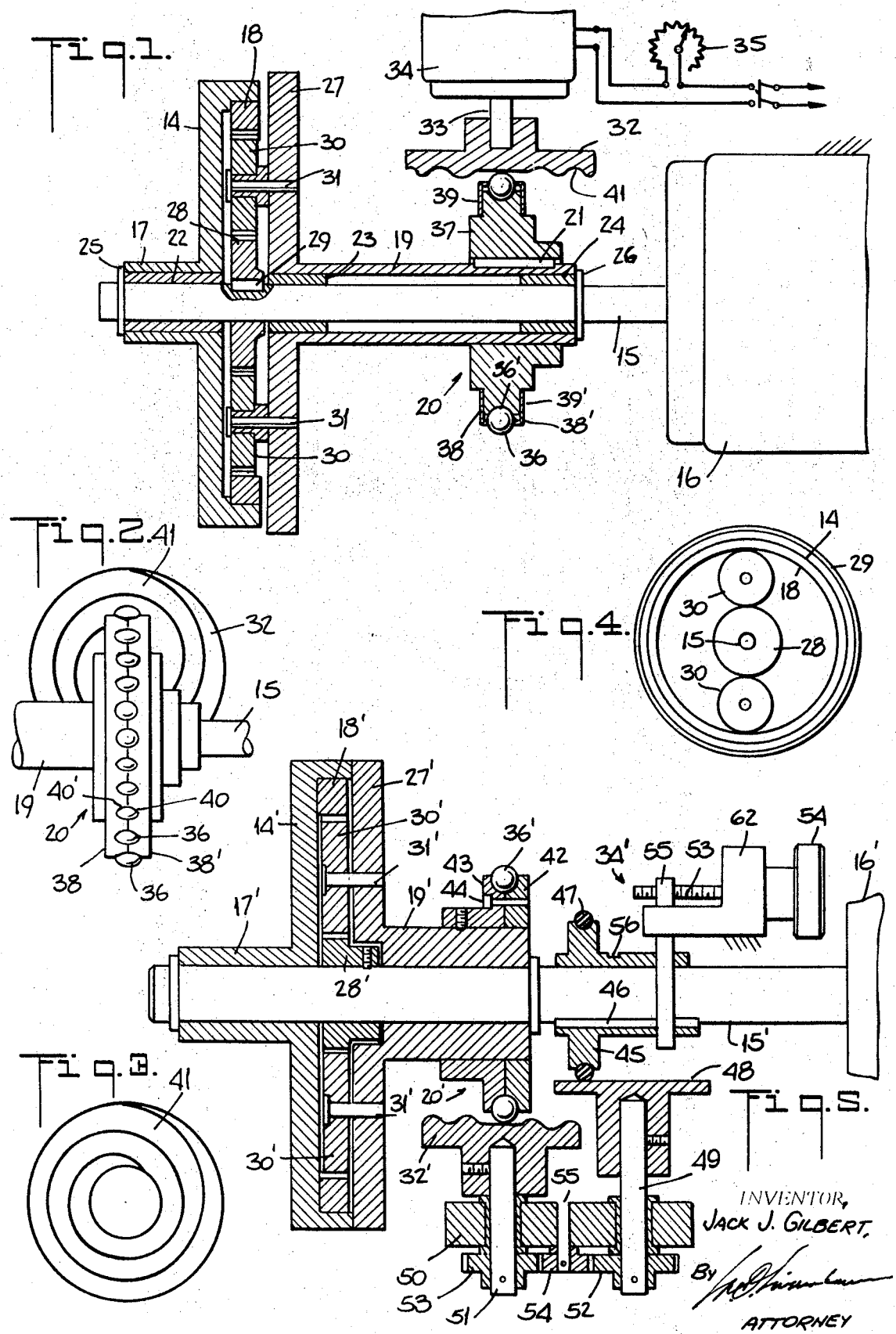

3,537,334
INFINITELY VARIABLE, POSITIVE DRIVE SPEED CHANGER WHICH CAN ALSO ACT AS A REVERSER
Jack J. Gilbert, Spring Valley, N.Y., assignor to Spyro-Dynamics Corporation, a corporation of New York
Filed Aug. 2, 1968, Ser. No. 749,849
Int. Cl. F16h 37/14, 1/12, 37/00
U.S. Cl. 74—675                                    5 Claims

ABSTRACT OF THE DISCLOSURE

The apparatus employs a planetary gear system. The input shaft carries a central sun gear. The output shaft carries an internal ring gear. An arm on an auxiliary shaft carries a plurality of equispaced orbital gears which are rotatable thereon and in meshed engagement with said sun and ring gears. All of said shafts rotate about a common axis. The auxiliary shaft carries a spur gear of special construction cooperating with a spiral face cam which is rotatably driven by an adjustable speed means in a predetermined direction, to influence output shaft performance.

The present invention relates to speed changers.

The principal object of this invention is to provide a speed changer of novel and improved construction having a new mode of operation affording nonabruptness in speed change and so is stepless in operation. An incident of its mode of operation, adapts the apparatus to serve as a reverser, without change of gearing.

A further object thereof is to provide a speed changer of the character described, having direct drive without loss of speed control.

Still a further object of this invention is to provide a novel and improved apparatus having the foregoing attributes, which is reasonable in cost to manufacture, extremely simple to operate, and which is efficient in carrying out the purposes for which it is designed.

Other objects and advantages will become apparent as this disclosure proceeds.

For one practice of this invention, the apparatus employs a planetary gear system comprising a central sun gear on the input shaft, an internal ring gear on an annulus carried on the output shaft, and an arm on a powered auxiliary shaft whose speed is adjustable; said arm carrying a plurality of rotatable orbital gears in meshed engagement with said sun and ring gears. All of said shafts have a common axis of rotation. The auxiliary shaft carries a spur gear whose teeth are rotatably mounted spherical elements free for movement about their geometric centers respectively, cooperating with a spiral face cam which is driven by a a low-powered means affording easy speed change to the cam shaft.

In the accompanying drawing forming part of this specification, similar characters of reference indicate corresponding parts in all the views.

FIG. 1 is a longitudinal view shown mostly in section, of a speed changer embodying the teachings of this invention, and includes a diagram of the circuit of an electric motor which drives the cam shaft.

FIG. 2 is a fragmentary bottom view of part of FIG. 1, showing the face cam and the special spur gear which it drives.

FIG. 3 shows the face of said cam.

FIG. 4 is a diagrammatic showing of the planetary gearing system included in FIG. 1.

FIG. 5 is a view similar to FIG. 1, of a modified embodiment of the apparatus.

In the drawing, the numeral 15 designates the input shaft which is that of the fixedly mounted electric motor 16. The numeral 17 designates the tubular output shaft revolvably mounted thereon, carrying an internal ring gear 18 on a plate 14. Between the motor and said output shaft, is a tubular auxiliary shaft 19, revolvably mounted on the input shaft, carrying a spur gear structure denoted generally by the numeral 20, which is keyed thereto as at 21. The numerals 22, 23 and 24 indicate spacer bushings, and 25, 26 denote split spring rings in annular grooves in the main shaft 15, to maintain the assembly. The auxiliary shaft 19 carries an arm or plate 27. The input shaft 15 carries a gear 28 keyed to it as at 29, which is usually called the central sun gear of the system. The arm 27, has revolvably mounted thereon what may be called the orbital gears 30, which are in meshed engagement with said sun gear 28 and the ring gear 18; the numerals 31 indicating the stud shafts carrying said gears 30. It is evident that the shafts 15, 17 and 19, rotate about a common axis. The spur gear 20 is in engagement with a spiral face cam 32, which is on the shaft 33 of a fixedly mounted, relatively small electric motor 34, whose speed is controlled by the rheostat 35.

Each tooth of the spur gear structure 20, is a steel ball 36 held in a socket in the periphery of a wheel 37. Each such ball tooth is free to turn in all directions about its geometrical center like in a ball bearing. Each socket 36' is a spherical cavity segment whose altitude is no more than the sphere's radius and preferably a bit less. Notched ferrules 38, 38' secured by screws 39, 39' on the respective wheel faces, maintain the assembly; mating notches as 40, 40' forming a hole in whose rim wall the associated ball is held captive; the diameter of such hole being less than the diameter of the ball, and the ferrules being of thin but strong sheet metal, the ball is exposed to the extent of a spherical segment nearly, but a bit smaller than a semisphere. Such exposed part being the active part of the tooth which comes into the spiral channel 41 of the face cam 32. One revolution of said face cam, advances the gear 20, one tooth. Of course, the centers of all the ball teeth are coplanar. The ball-toothed gear structure may be made of two halves 42, 43 held together by screws 44, with mating socket segments encompassing a bit more than one-half of each ball 36' as shown in the gear structure indicated generally by the numeral 20'.

In operation, the input shaft 15, and hence the sun gear 28, turns counter-clockwise. The orbital gears 30 will turn clockwise on their stud shafts 31. The ring gear 18, and hence the output shaft 17 will turn clockwise. The direction of rotation of the auxiliary motor 34 is such that the arm 27, and hence the auxiliary shaft 19, will turn counter-clockwise. The orbital gears 30, in revolving around the sun gear 28, in the same direction as the sun gear 28 revolves, will reduce the speed at which such orbital gears turn about their stud shafts. This causes the output shaft 17 to slow down. The higher the speed of motor 34, the slower will be the speed of the output shaft 17, until at some higher speed of said motor 34, the output shaft 17 will come to rest altogether. Upon further increase in the speed of said motor 34, the output shaft 17 will rotate counter-clockwise, which is in reverse of its former direction, and with continued increase in the speed of said motor 34, the speed of the output shaft 17 will increase. The motor 34 is a comparatively small Universal series motor whose speed is adjusted by manipulation of the rheostat 35.

Instead of using an independent motor to drive the auxiliary shaft, any suitable variable driving means powered by the input shaft may be provided therefor. One such means is indicated generally as 34', as shown in the modified embodiment illustrated in FIG. 5, wherein all components which are incident in FIG. 1, are marked with the same numerals respectively, but primed, and so the input shaft is marked 15', the output shaft is 17', and the auxiliary or speed-influencing shaft is denoted as 19'. The arm 27' holds the orbital gear 30' which revolve on the stud shafts 31'. The sun gear is 28', and the ring gear is 18' on its annulus 14'.

The means 34' comprises a wheel 45 on a tubular shaft 56 which is keyed at 46 to the input shaft, but is slidable therealong. This wheel has a rubber tire 47 which is in frictional engagement with the surface of a plate 48 carried on a rotatable shaft 49 journalled on a stationary frame piece 50, which piece also carries the journalled shaft 51. The gears 52, 53 on these shafts, mesh with an intermediate gear 54 which is rotatably carried on the stud 55. The shaft 51 carries the spiral face cam 32' which cooperates with the ball-toothed spur gear 20' on the auxiliary shaft 19'. The numeral 62 designates a fixed bracket carrying a captive rotatable screw 53 operated by a turn knob 54. The screw 53 engages a threaded hole in an arm 55 in which the shaft 56 is journalled, so that upon turning said knob, the shaft 56 will slide along the input shaft 15', and hence in changing the distance of the point of contact of the tire 47 from the center of the plate 48, the speed of the auxiliary shaft 19' will change.

In a working model built as shown in FIG. 1, which is drawn substantially to scale, the motor 16 is of 1/12 horsepower, operates on 110 volts and its speed is 1728 r.p.m. The motor 34 is a series Universal motor, operates on 110 volts and is controlled by a rheostat 35 whose resistance is variable. The sun gear 38 has a pitch diameter of 0.750 inch, and has 24 teeth. Each of the orbital gears 30 has a pitch diameter of 0.625 inch, and has 20 teeth. The internal ring gear 18 has a pitch diameter of 2.000 inches and has 64 teeth. The ball-toothed spur gear 20 has a pitch diameter of 1.604 inches and has 20 teeth. The pitch of the convolutions of the spiral groove 41 of the face cam 32, is that of the teeth of said spur gear, so such spur gear 20 will move one tooth for every revolution of said face cam. These dimensions are a mere example of this one embodiment of this invention. The speed of the output shaft 17, is steplessly from zero.

This invention is capable of numerous forms and various applications without departing from the essential features herein disclosed. It is therefore inteded and desired that the embodiments herein shall be deemed merely illustrative and not restrictive and that the patent shall cover all patentable novelty herein set forth; reference being had to the following claims rather than to the specific showings and description herein, to indicate the scope of this invention.

I claim:
1. A variable speed changer comprising an input shaft, a sun gear mounted on said input shaft, a tubular auxiliary shaft mounted for rotation on said input shaft at one side of said sun gear, means for driving said auxiliary shaft at a predetermined, adjustable speed, at least one orbital gear rotatably carried by said auxiliary shaft with its teeth in engagement with said sun gear, a tubular output shaft mounted for rotation on said input shaft at the opposite side of said sun gear, and an internal ring gear carried by said output shaft concentrically with and spaced from said sun gear and with its teeth in engagement with said orbital gear.

2. A variable speed changer comprising an input shaft, an auxiliary shaft and an output shaft having a common axis of rotation, a central sun ger carried on the input shaft, an internal ring gear carried concentrically on the output shaft, a support carried on said auxiliary shaft, at least one orbital gear revolvably carried on said support in meshed engagement with said sun and internal ring gears, and means for driving said auxiliary shaft comprising a spur gear mounted thereon, a revolvably mounted, spiral face cam cooperating with said gear for advancing said spur gear one tooth for each revolution of said cam, means for driving and turning said cam and means for adjusting the speed of said cam driving means.

3. A variable speed changer as set forth in claim 2 wherein said spur gear comprises a plurality of balls extending from, and mounted for universal rotation at, the periphery thereof and wherein said cam has a spiral groove in the face thereof, said spur gear being mounted with at least one of said balls in said groove with the surface of the ball in engagement with the wall of said groove.

4. An apparatus as defined in claim 2, wherein each tooth of said spur gear is rotatably mounted thereon so that when the spiral face cam is turned, it will turn the teeth in contact therewith; all axes of rotation of the teeth being in a plane perpendicular to the axis of rotation of said spur gear.

5. An apparatus as defined in claim 4, wherein each tooth is of spherical form, held for rotation in all directions about its geometric center; all said centers being in a plane perpendicular to the axis of rotation of said spur gear.

References Cited

UNITED STATES PATENTS

| 635,875 | 10/1899 | Smith | 74—464 |
| 2,334,074 | 11/1943 | Coy. | |
| 3,007,302 | 11/1961 | Vincent | 75—675 X |
| 3,263,523 | 8/1966 | Nash | 74—690 X |

FOREIGN PATENTS 1,130,702  10/1956  France.

ARTHUR T. McKEON, Primary Examiner

U.S. Cl. X.R.
74—416, 424.5, 465